US012121757B2

(12) United States Patent
Nilov

(10) Patent No.: US 12,121,757 B2
(45) Date of Patent: Oct. 22, 2024

(54) HIGH AREA FILTER HAVING A STIFFENING STRUCTURE, AND METHODS OF MAKING THE SAME

(71) Applicant: Maksim Nilov, Princeton, NJ (US)

(72) Inventor: Maksim Nilov, Princeton, NJ (US)

(*) Notice: Subject to any disclaimer, the term of this patent is extended or adjusted under 35 U.S.C. 154(b) by 743 days.

(21) Appl. No.: 17/302,411

(22) Filed: May 3, 2021

(65) Prior Publication Data

US 2021/0387030 A1 Dec. 16, 2021

Related U.S. Application Data

(60) Provisional application No. 63/037,078, filed on Jun. 10, 2020.

(51) Int. Cl.
| | |
|---|---|
| *A62B 23/00* | (2006.01) |
| *A41D 13/11* | (2006.01) |
| *A62B 23/02* | (2006.01) |
| *B01D 29/21* | (2006.01) |

(52) U.S. Cl.
CPC ........ *A62B 23/025* (2013.01); *A41D 13/1138* (2013.01); *B01D 29/21* (2013.01)

(58) Field of Classification Search
CPC ... A62B 23/025; A41D 13/1138; B01D 29/21
See application file for complete search history.

(56) References Cited

U.S. PATENT DOCUMENTS

| | | | | |
|---|---|---|---|---|
| 3,827,566 A | * | 8/1974 | Ponce | B01D 29/21 |
| | | | | 210/493.1 |
| 4,842,739 A | | 6/1989 | Tang | |
| 5,104,534 A | * | 4/1992 | Branchcomb | B01D 29/58 |
| | | | | 210/493.5 |
| 5,543,047 A | * | 8/1996 | Stoyell | B01D 29/21 |
| | | | | 210/493.5 |
| 6,598,749 B2 | * | 7/2003 | Paul | B01D 29/58 |
| | | | | 210/493.4 |
| 7,989,372 B2 | | 8/2011 | Angadjivand et al. | |
| 8,236,210 B2 | | 8/2012 | Hartmann et al. | |
| 10,112,130 B2 | | 10/2018 | Savstrom et al. | |
| 2015/0343341 A1 | * | 12/2015 | Carrion | B01D 29/54 |
| | | | | 210/338 |

* cited by examiner

*Primary Examiner* — Steven O Douglas
(74) *Attorney, Agent, or Firm* — Michael J. Feigin, Esq.

(57) ABSTRACT

A helically pleated filter which resists movement or collapse when subjected to operational loads, which in one embodiment includes a stupport element. The construction process involves creating a tube from a sheet of filter media, closing one end using a seam, a cap, or another method, and stiffening the tube closed end with a fixedly retained stiffening element. The closed and stiffened end is then rotated relative to another section of the tube, preferably held stationary over a mandrel tool. This filter can be integrated into conventional air filtering devices, such as surgical masks, half facepiece respirators, or filter cartridges.

7 Claims, 6 Drawing Sheets

HIGH AREA FILTER HAVING A STIFFENING STRUCTURE, AND METHODS OF MAKING THE SAME

CROSS-REFERENCE TO RELATED APPLICATION(S)

This application claims the benefit of U.S. Provisional Patent Application No. 63/037,078, filed Jun. 10, 2020, which is incorporated by reference herein in its entirety.

TITLE

High area filter having a stiffening structure, and methods of making the same

SUMMARY OF INVENTION

A folded, pleated filter resistant to movement or collapse under operational loads, which may have an integral stiffening or support element is hereby disclosed. The said filter may be constructed by forming a tube from a sheet of filter media and closing an end of the said tube with a seam, a cap, or other means, and installing a stiffening element on or within the said closed end, and rotating the said closed stiffened end relative to another section of the said tube, which is preferably held fixed over a mandrel tool. The said filter may be incorporated into conventional air filtering devices such as surgical masks, half facepiece respirators or filter cartridges.

BACKGROUND INFORMATION a. Technical Field

The currently taught filter relates to filters for use in respiratory protection applications. The invention may be tailored for biological and other types of protection of a user by selecting appropriate filter media, or a layered composition thereof, to provide the desired protection. The said novel filter may be incorporated into a breathing apparatus or mask by overmolding, by modifying an existing mask design or pattern, by using the said filter in a replaceable filter cartridge, or by other means.

b. Description of Related Art

A disposable molded face mask is taught in U.S. Pat. No. 7,989,372. The said prior art concerns a protective mask which may be produced with melt blown precursor materials using a mold and ultrasonic welding. A vast supply of such disposable masks is necessary to satisfy mass demand for respiratory protection, as these masks cannot be worn beyond a typical useful life of between four and twelve hours.

U.S. Pat. No. 8,236,210 teaches the manufacture of helical form fluid filters using an inflatable mandrel element. Collapsing a set of pre-formed helical corrugations is contemplated in the said patent. The said fold lines are pre-formed on a mandrel that is shaped and adapted for forming the said corrugations.

Prior art patent 10,112,130 discloses a self supporting, pleated filter element configured for inward flow filtration. The pleats comprising the invention described therein are non helical, and the authors teach a sequence of pleats which are formed into an appreciably conical form in order to produce the taught articles.

U.S. Pat. No. 4,842,739 discloses an enhanced area fluid filter having a one or more disc shaped pleat zones.

c. Objects and Advantages

An objective of the present invention is the production of effective reusable respirators and respiratory protection filters from a range of suitable materials. During the Covid-19 pandemic, the scientific community has disclosed that certain dense household cottons, various paper towels, certain home vacuum bags, and polyester chiffons are excellent non-specialized materials for filtering air. By taking advantage of these or other suitable materials, those skilled in the relevant arts may make an air filtering mask or respirator using the presently taught invention. A community of such producers may distribute a set of mask or respirator construction plans amongst themselves.

Another objective of the disclosed filter is a high airflow rate. While many prior art mask designs present an area of filter material which generally is sufficient to cover a wearer's face, the present invention can greatly increase the usable filter area due to novel and efficient packaging, accomplished through material pleating, convolution, and a cup like stiffened net filter shape.

A further advantage of the current invention is its suitability for overmolding, given the filter's cup like three dimensional form factor. Enhanced sealing of the periphery of the filter, attained by overmolding the filtering construct by a mask or filter cartridge body is therefore possible and desirable. The said overmolding approach may eliminate leakage completely between the filter and its host enclosure.

The said filter media tube of the current invention may be incorporated into popular cloth facemask design types, including those formed from symmetrical left and right pre-cut cloth patterns. In one embodiment, a said tube open end (212) may originate by the conventional location of the contoured vertical symmetry seam which characterizes the said mask design type. The left and right sides of the mask body may thus be contoured to respectively merge into a tubular form, from which a filter of the current invention may be devised.

The current invention enables one to design a filter with multiple configurations and arrangements of various filter media. For example, silk cloth, polyester chiffon fabric, or other material may be sandwiched together with, and overlay the one or more said base tube materials to form a multi layer filter. Furthermore, a single layer filter is possible with creasable materials such as light paper filter media or metal plated synthetic cloth.

Due to the high flow rate inherent in the present invention, the need for an exhaust valve is reduced. When an airborne or aerosolized disease pathogen makes personal air filtration a priority in enclosed spaces such as mass transit vehicles, air exhausted from a respirator must be filtered. An exhaust valve may be incorporated into a support element of the currently taught filter. The said valve may preferably be enclosed by the said pre-filter layer. In this configuration, the air exhaled by a user is filtered.

Finally, an important objective of the current disclosure is a reusable respirator or filter cartridge that may be sterilized in a home oven, or in an autoclave, or by washing in a soapy or surfactant rich solution, or other suitable means, eg. UV light exposure.

In summary, the present invention may be used in a wide range of airway protection devices, may be suitable for reuse and sterilization, and may be optimized for manufacture by a community of individuals from a wide range of materials.

DETAILED DESCRIPTIONS OF THE DRAWINGS

The current disclosure should not be construed as limiting, but merely as providing exemplifications of particular embodiments.

Figure 1:
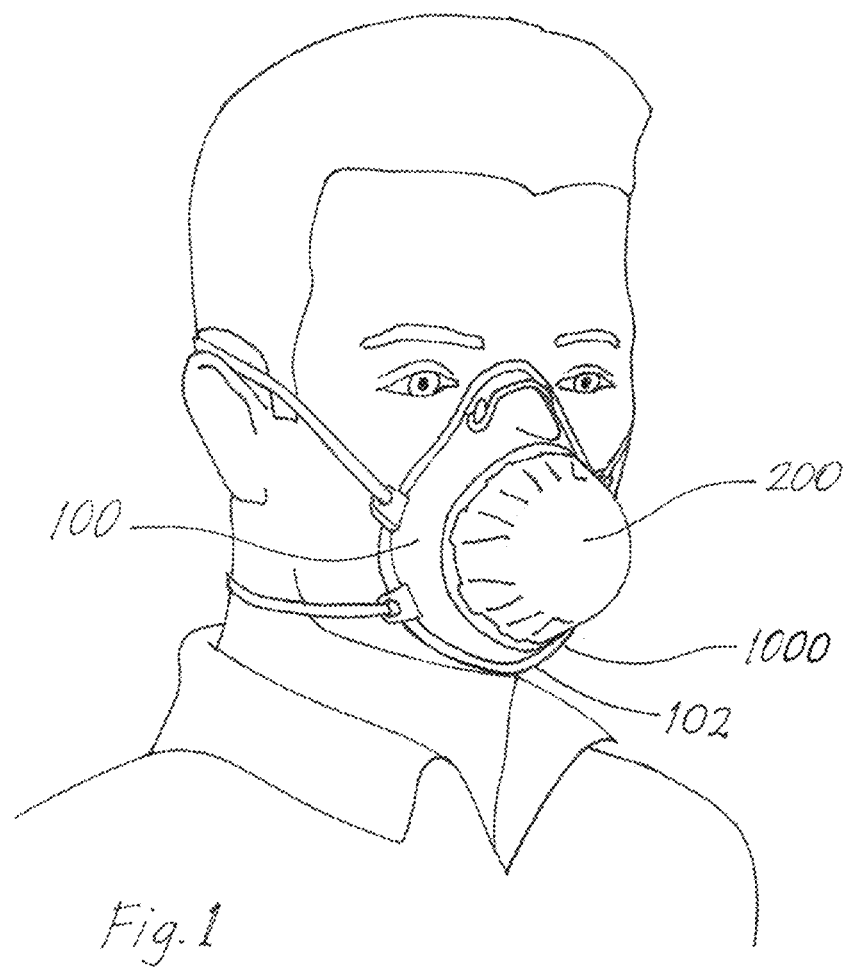
FIG. 1 illustrates a person wearing a face mask incorporating the present invention.

FIG. 1 depicts a person wearing a face mask (1000) which incorporates a filter (200) taught by the present invention. The filter (200) is preferably overmolded by, or sealingly affixed to, a silicone respirator body (100). The respirator body (100) may provide a flange, lip or edge (102) for forming a compliant seal to a wearer's face.

Figure 2:
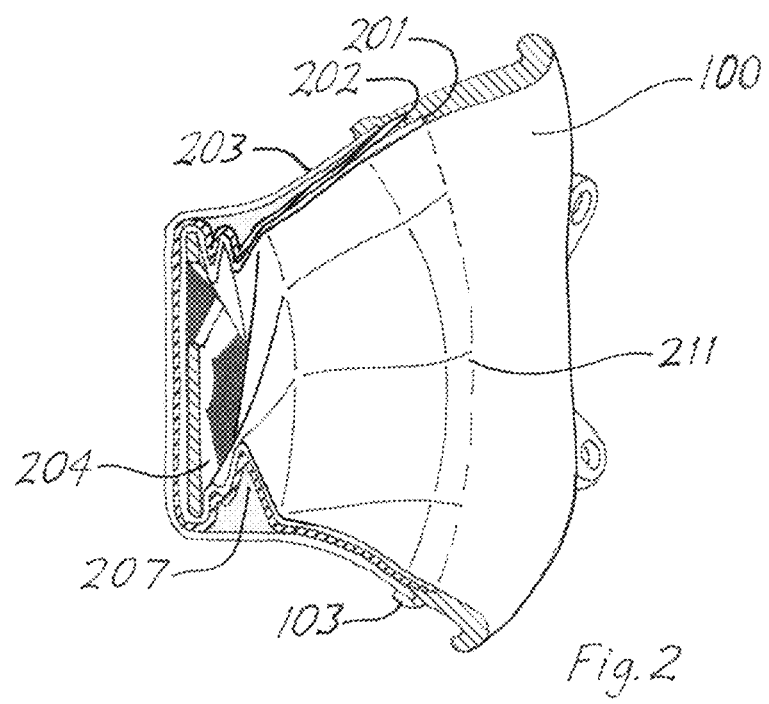
FIG. 2 illustrates a sectional view of a disclosed filter embodiment overmolded by a respirator mask body.

FIG. 2 illustrates a sectional view of the disclosed filter adapted for use in a face mask. The depicted filter embodiment comprises three layers. A pre-filter material layer (203) encapsulates the principal helically pleated filter layers (202) and (201), which share a multitude of stiffening and area enhancing pleats (207) and (211).

This said pre-filter layer may be comprised of highly breathable material and can serve to maintain the said helically pleated layers in a substantially collapsed state. Functionally, the said outer layer also serves as a dust shield.

It is highly advantageous to fold, crumple, and otherwise convolute the said pre-filter layer (203) in order to increase its useful area. One example of such folding may be found in the linear folds of a conventional, rectangular surgical mask body. A pre-filter media sheet having such folds may be used to wrap the principal helically pleated filter layers (202) and (201), and to secure them in a substantially folded state, thereby forming a robust composite filter. The said pre-filter may be selectively sewn onto the helically pleated precursor layers, or joined thereto with an adhesive, or may be retained on the said composite filter by overmolding the said composite filter with an elastomeric mask body.

A perforated support element (204) serves to support the filter structure against deflection due to pressure differentials encountered while filtering gases, eg. filtering of air used in breathing by a human user. The filter and post-filter media layers (201) and (202) are wrapped around support element (204) and thereby retain it in place with a ring of common helical pleats (207). A set of peripheral pleats (211), oriented substantially longitudinally to the filter media tube, are formed by folding a sheet or disc of material around an end face of a mandrel (400), per the current disclosure's step (A) of FIG. 5, in order to further stiffen the filter structure. The pleat sets (207) and (211) serve to increase the available filter media area in a size constrained package.

It is possible to include a series of support elements (204) mediated with corresponding collapsed helical pleat rings (207) in an alternative embodiment to that illustrated in FIG. 2.

Preferably, the silicone body (100) includes a peripheral flange (103) to accomodate filter (200) where it merges into compliant body (100), for providing additional reinforcement material for the encapsulation of filter (200) by silicone body (100).

Figure 3:
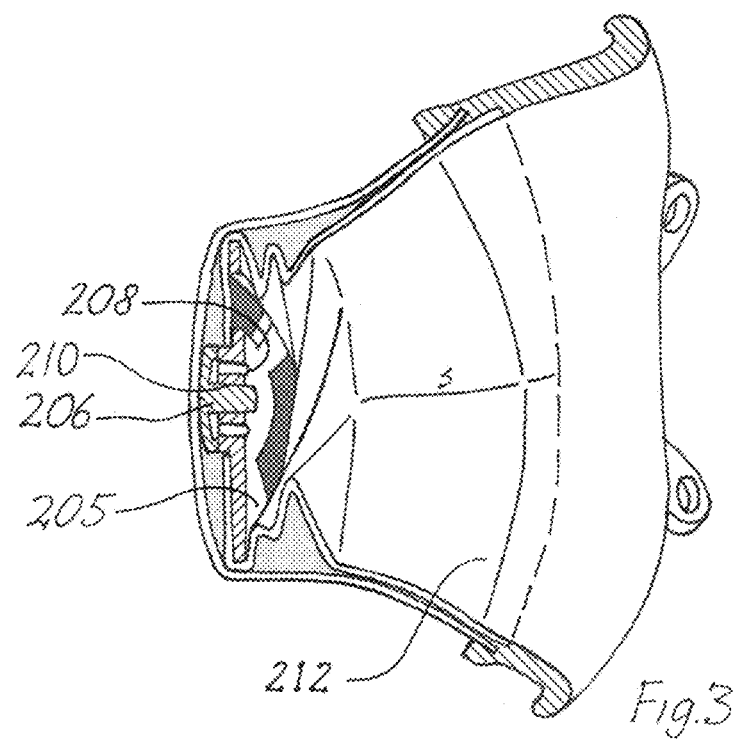
FIG. 3 illustrates a sectional view of a disclosed filter embodiment equipped with an exhaust valve, and used in a face mask.

Turning to FIG. 3, we see an illustration of a valved half facepiece respirator incorporating the presently taught invention. Support element (205) hosts a compliant umbrella flapper valve (206) and provides flow ports (208). Positive air pressure in flow ports (208), eg. pressure created by human lungs during exhalation, serves to actuate the flapper valve (206). The said flapper valve (206) may be retained in bore (210) on support element (205) by an interference fit.

Figure 4:
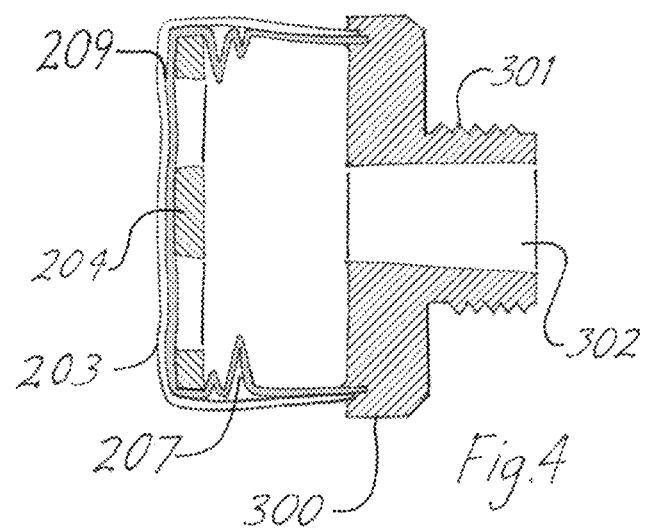
FIG. 4 illustrates a sectional view of the disclosed filter adapted for use in a filter cartridge.

In FIG. 4, a respirator filter cartridge incorporating the current invention is depicted. A filter layer (209) enclosed by a pre-filter layer (203) is shown. A set of helical pleats (207) secures a support element (204). Cartridge body (300) overmolds the depicted composite filter. The said body (300) includes a threaded fitting (301) which may be sealingly accepted by a half facepiece respirator, as well as a passage (302) for fluid communication with the said respirator.

Figure 5:
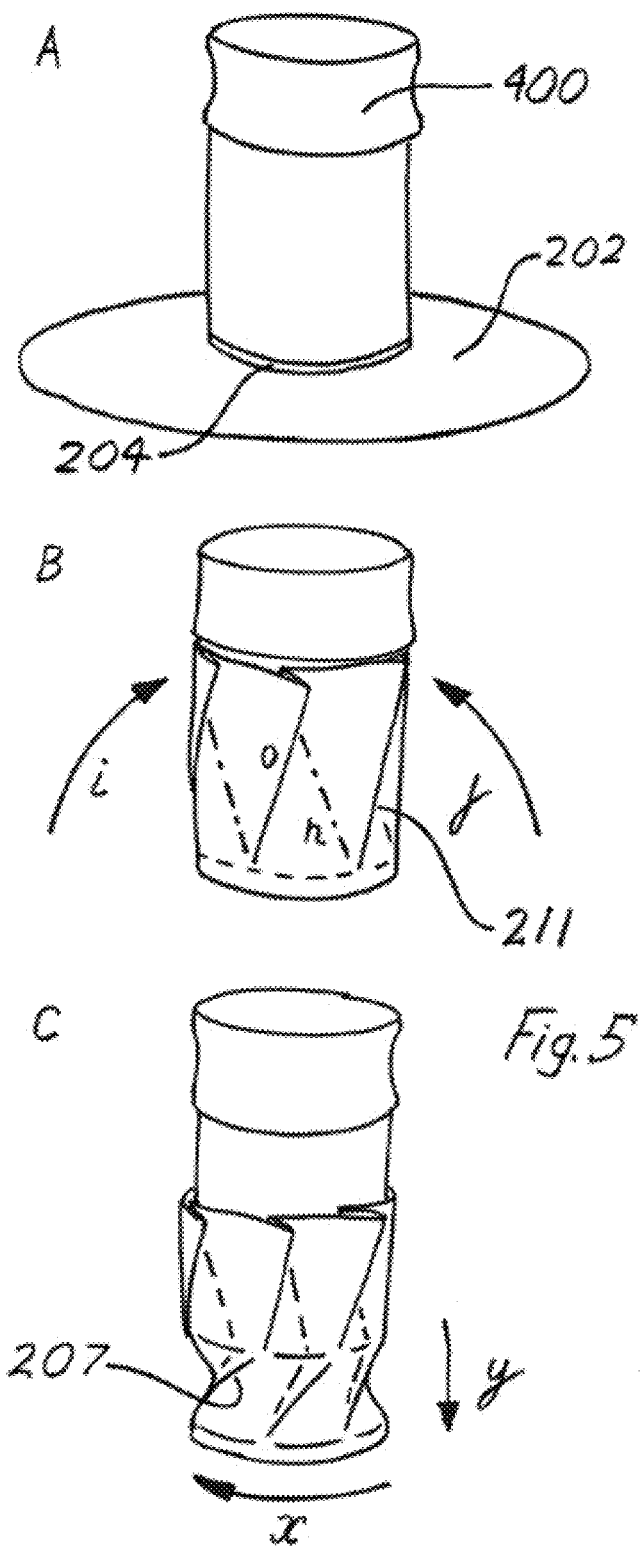
FIG. 5 illustrates key steps in constructing the present invention's filter element from a disc of filter material.

A filter which embodies the present invention may be made using a series of steps which are illustrated in FIG. 5. Step (A) depicts a sheet or disc of filter material (202) which may be aligned concentrically with a cylindrical mandrel (400) and a support element (204). The said mandrel may be stacked onto and aligned axially with the support element before proceeding to the next step (B).

Continuing to step (B), one may fold the filter media sheet or disc (202) towards the said mandrel (400) as indicated by arrows (i) and (j). To enhance conformance of the sheet material to the mandrel form, one may make substantially diverging pleats (n), (o) as shown in step (B). Such pleats may originate from a narrow fold by the support element and terminate in a wide flare of material due to local differences between the mandrel diameter and the diameter of the material disc (202).

Once the filter media is folded to considerably conform to mandrel (400) and support element (204), and obtains a substantially cup-like form, the support element should be clamped and retained within the said form's closed end, and the said form should be partially slid off the mandrel in the direction (y).

Then, one may secure the said cup-like form on the mandrel by clamping it thereon, and then proceed to rotate the cup-like form's closed end and mandrel (400) relative to each other in order to form a section of helical pleats. The said rotation will cause filter media to collapse inwards throughout an unsupported section between the mandrel (400) and the support element (204), forming a considerably hyperboloid surface comprised of pleats (207).

Because the circumferential pleats (207) may describe a collapsed ruled hyperboloid, the length of any such pleat (207) may not exceed the diameter of the mandrel (400) used to form the initial filter media tube. If the said limitation is not respected, the resulting pleats (207) will intrude on and wrap over each other, forming a constriction therebetween.

Figure 6:
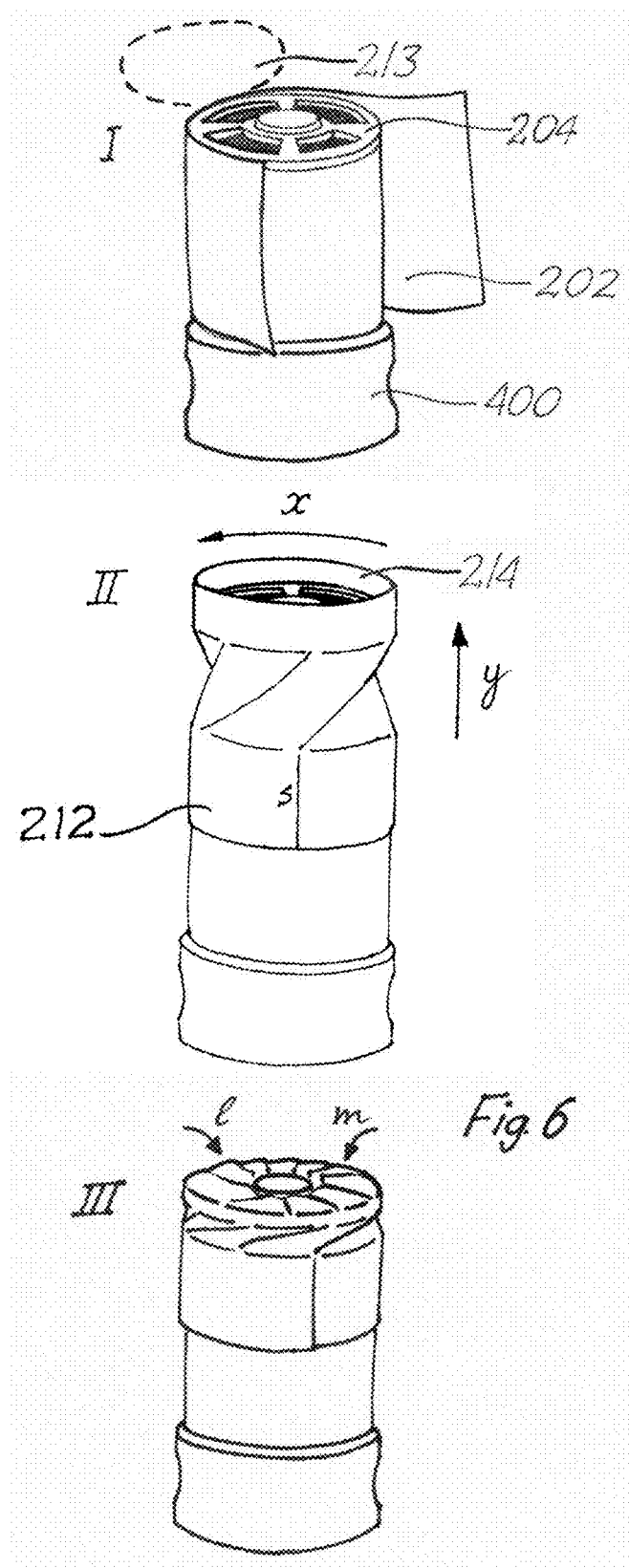
FIG. 6 illustrates key steps in constructing the present invention's filter element from a sheet of filter material.

FIG. 6 depicts a method of constructing the filter by wrapping a sheet of filter media (202) around a mandrel (400) and developing the said sheet into a tube by forming a seam (s) where the opposing sheet edges overlap on the said mandrel (400).

The first step (1) includes stacking a support element (204) onto the mandrel (400), axially aligning the said elements, and then proceeding to secure a sheet of filter material (202) around the said mandrel, creating the said seam (s) with an appropriate joining method, eg. ultrasonic welding or an adhesive.

To complete Step (II), one may first slide the said filter media tube towards and past support element (204), in order to create a length or section of unsupported material (214). Then, one may clamp the said tube over the support element (204), and then slide the said tube off the mandrel in the direction (y). Then, one may clamp the said tube over the mandrel (400), and rotate the said support element (204) relative to the mandrel (400), to form pleats in the unsupported filter region bounded by the said mandrel and the said support element.

Per step (111) of FIG. 6, the section (214) of the filter media tube which extends over and encloses the support element (204) is folded inwards, per arrows (I) and (m), to overlap and extend past any air conduits which are preferably present in the said support element. The folded material edges are then sealingly bonded or adhered with a suitable means to the support element or to each other in order to close the filter media tube of the presently taught invention.

The presently disclosed filter may be constructed from a contiguous, capped filter media tube. There are numerous processes by which the said construct may be made, known to those skilled in the art of mass production of filters. Eg. a said contiguous capped filter media tube may be developed by applying fibrous or melt blown material onto a rotating mandrel form. A contiguous capped filter media tube may also be developed by forming and joining a die-cut pattern of filter media depicted in Step (1) of FIG. 6, which comprises at least an integral pre-cut cap (213) and a sheet (202).

In another embodiment, the initial filter media tube may be produced by helically or longitudinally wrapping one or more strips of material around a mandrel, and using a section of one or more of the said material strips to cap off the cylinder by wrapping a said strip length over a mandrel (400) end face, and then joining the said strips together through appropriate welding, joining, or adhesive methods.

In yet another embodiment, the support element (204) heretofore described may be used during manufacture only. A disposable or collapsible support element may reduce obstruction of airflow through the presently taught filter, and may allow for better balance or distribution of forces in the filter assembly. In this embodiment, the support element (204) may not be bonded to the filter media. It may be removed from the finished filter assembly by cutting it into smaller pieces, in case the support element is designed to be fully disposable, or by collapsing it, in case the support element is designed to be collapsible or reusable.

The said principal helically pleated filter media layers (202) and (201) may be held in place by an outer pre-filter media layer wrapped around the said helically pleated filter layers. It is also possible to maintain the helically pleated filter layers' folded configuration by joining the individual pleats together at certain advantageous points such as mid-pleat, or near common vertices.

I claim:

1. A helically pleated filter, comprising:
a tubular structure formed from a section of filter media, said tubular structure defining an internal volume; and having an open end; and a closed end opposite said open end; and
a pleated section of said tubular structure having circumferential helical pleats exhibiting a substantially hyperboloid surface.

2. The helically pleated filter according to claim 1, further comprising:
a support element present at said closed end of said tubular structure, wherein said support element stiffens said helically pleated filter.

3. A method of forming the helically pleated filter of claim 1, comprising steps of:
placing a sheet of filter media on an end face of a mandrel tool; and
wrapping said sheet of filter media around a perimeter of an end face of said mandrel, forming a cup-like tubular structure.

4. A method for forming said pleats of claim 1, comprising steps of:
supporting a distinct first section of said filter media tube securely and fixedly over a first mandrel;
supporting a second section of filter media tube securely and fixedly over a second mandrel; and
rotating said second section of said filter media tube relative to said first section.

5. A method for forming said pleats of claim 1, comprising steps of:
supporting a first section of a filter media tube at least three points of a first plane substantially normal to a longitudinal axis of said filter media tube;
supporting a second section of said filter media tube upon at least three points of a second plane substantially normal to said longitudinal axis of said filter media tubes; and
rotating said second section of said filter media tube relative to said first section.

6. A half facepiece respirator comprising:
a filter cartridge having a cartridge body, said cartridge body further comprising said helically pleated filter of claim 1;
a respirator body;
a mounting and retaining means of said respirator body for accepting said filter cartridge;
a sealing means of said respirator body, said sealing means formed from a lip or edge of said respirator body and adapted to form a compliant seal to a face of a wearer pf said half facepiece respirator.

7. A breathing mask comprising:
said helically pleated filter of claim 1;
a mask body adapted to cover at least a nose and a mouth of a wearer, said mask body transitioning into said tubular structure of filter media projecting therefrom;
a sealing means adapted to encircle at least a wearer nose and said mouth, forming a seal with a plurality of surrounding anatomical regions of said wearer.

* * * * *